Figure 1:
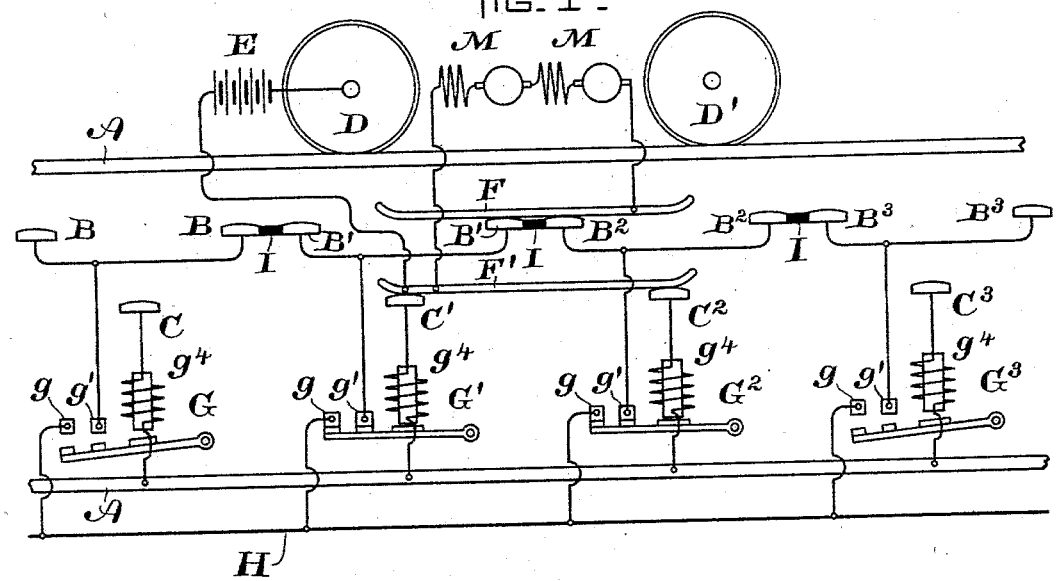

(No Model.) 2 Sheets—Sheet 1.

W. B. POTTER.
CLOSED CONDUIT ELECTRIC RAILWAY.

No. 589,790. Patented Sept. 7, 1897.

WITNESSES:
A. H. Abell.
A. F. Macdonald.

INVENTOR.
William B. Potter,
by Geo. B. Blodgett,
atty.

THE NORRIS PETERS CO., PHOTO-LITHO., WASHINGTON, D. C.

(No Model.) 2 Sheets—Sheet 2.

W. B. POTTER.
CLOSED CONDUIT ELECTRIC RAILWAY.

No. 589,790. Patented Sept. 7, 1897.

WITNESSES.
A. H. Abell.
A. F. Macdonald.

INVENTOR.
William B. Potter, by
Geo. C. Blodgett,
Atty.

THE NORRIS PETERS CO., PHOTO-LITHO., WASHINGTON, D. C.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

CLOSED-CONDUIT ELECTRIC RAILWAY.

SPECIFICATION forming part of Letters Patent No. 589,790, dated September 7, 1897.

Application filed January 2, 1897. Serial No. 617,702. (No model.)

*To all whom it may concern:*

Be it known that I, WILLIAM B. POTTER, a citizen of the United States, residing at Schenectady, county of Schenectady, State of New York, have invented certain new and useful Improvements in Closed-Conduit Electric Railways, (Case No. 447,) of which the following is a specification.

My invention relates to closed-conduit systems of electric railways, or, as they are otherwise called, "surface-contact" systems, since a conduit in the proper sense of the word need not form part of the system.

I arrange the supply system so that there will be the usual track-rails and a feeder constituting the line-circuit and surface contacts or studs, which are normally disconnected from the line-circuit; also a series of automatically-acting electromagnetic switches which serve to connect the contact-studs with the feeder in sequence as the car passes. A small storage battery is provided upon the traveling vehicle for closing the switches at times when the line-current is not available. The energizing-coils for the switches are placed in the negative or ground side of the system between the negative terminal of the motor and the ground return. One coil is provided for each switch. The connections on the positive side of the system from the feeder to the contact-studs do not include magnet-coils and are of low resistance. The contact-studs are arranged in two series. One series I call the "high-potential studs." These are connected between the positive feeder and the positive terminal of the motors and so receive practically the full potential of the line. The second series I call "low-potential studs," since they form part of the circuit between the negative terminal of the motor and the ground, and their potential is only slightly greater than that of the ground. The high-potential studs are in number a multiple of the low-potential studs, but the high-potential studs are cross-connected in pairs or sets, so that the number of such sets is the same as that of the low-potential studs. The high-potential studs are not connected, as heretofore, to the feeder one at a time, but are connected in pairs or sets and the interconnections between the studs of each set are permanent. Of course the different sets of high-potential studs are insulated from each other and the high-potential studs are thoroughly insulated from the low-potential studs. In this way current cannot leak from any of the high-potential studs which happen to be alive through the low-potential studs, so as to close the switches, nor will leakage current from the high-potential studs hold the switches closed after the car has passed by.

Figure 2:
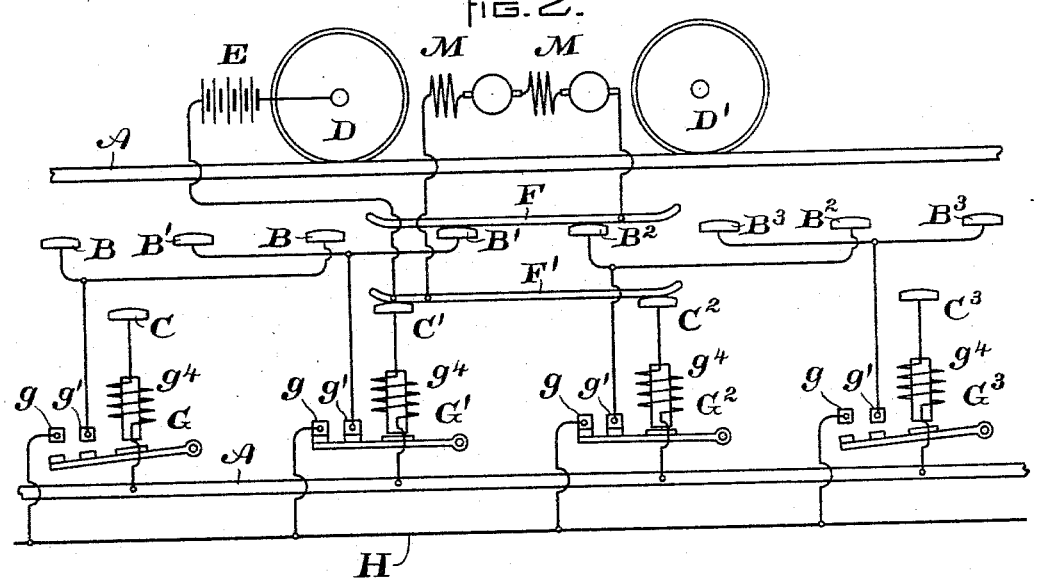
Figure 3:
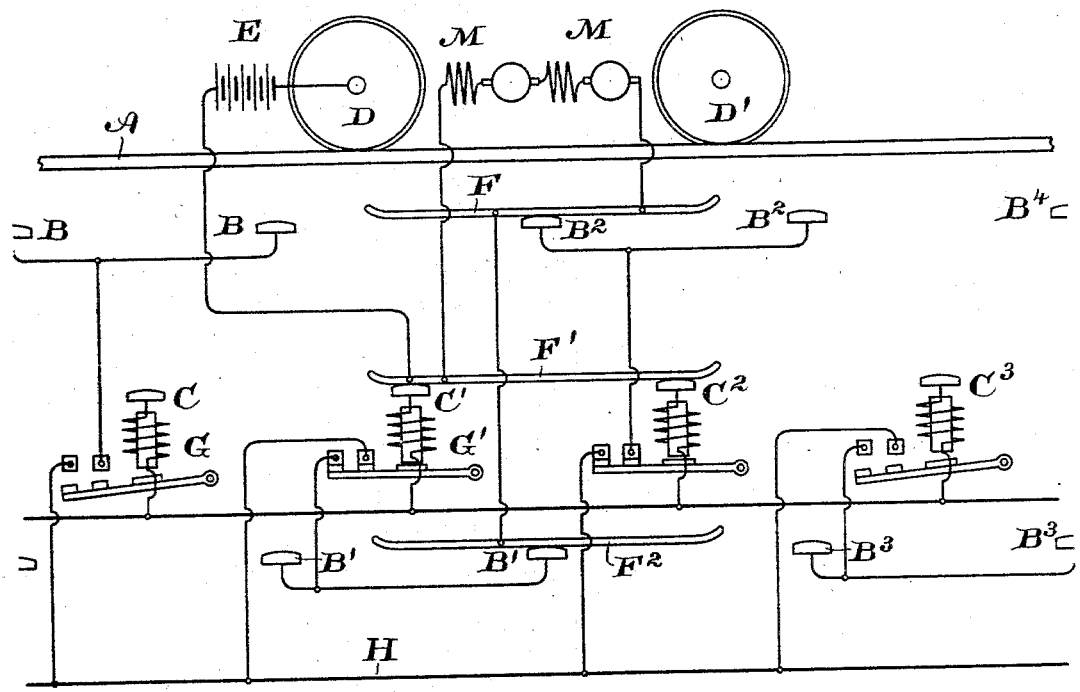
Figure 4:
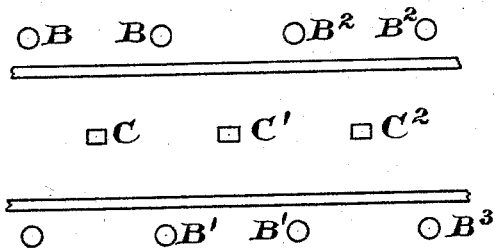
Figure 5:
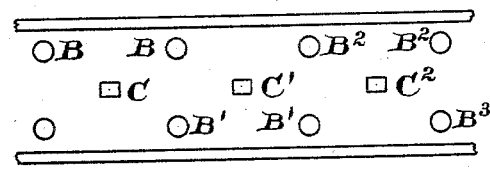

In the accompanying drawings, Figures 1 to 3 are respectively diagrams of different modified systems embodying my improvements. Figs. 4 and 5 are plan views showing different arrangements of the contact-studs in the street.

In Fig. 1, A A are the track-rails, B B', &c., are the high-potential studs on the positive side of the system, and C C', &c., are the low-potential studs on the negative side of the system. G G' G², &c., are the switches, comprising, as is customary, an armature carrying a moving set of contacts and also comprising a single magnet-coil in circuit between the low-potential studs, respectively, and ground. The moving switch-contacts close a circuit through the fixed contacts $g\ g'$, so that the high-potential studs are connected directly with the feeder H on closure of the switches. The high-potential studs are interconnected permanently, as shown in the diagram, and each set is connected to the contacts of the line-switch. It will be observed that in the arrangement shown in Fig. 1 the high-potential studs are twice as many in number as the low-potential studs, but are connected in pairs, so that there is one pair of high-potential studs for each low-potential stud. The different pairs are separated by insulating material, (shown at I,) and of course the high-potential studs are all normally insulated from the low-potential studs. The switch G controls the circuit to studs B B, the switch G' to studs B' B', and so on. D D' are the car-wheels, and N M' the motors, of which there may one or more. The positive terminal of the motors is connected to a shoe F, running on the high-potential studs, and the negative terminal of the motors to a second shoe F', running on the low-potential studs. A storage battery of moderate potential—say twenty or twenty-five volts—is connected between the shoe F' and ground. In the diagram the second terminal of the battery is shown grounded through the wheels. This arrangement is now well known in the art. The operation of these parts is as follows: The switches G' G² are shown closed and current is furnished the motors through the switches, the corresponding high-potential studs, and collector F. The current returns to ground through the shoe F', the low-potential studs, and magnet-coils on the switches. The car may move in either direction. Assuming that it advances toward the right, switch G' will open by gravity or a spring as soon as the shoe F' leaves stud C', but this shoe will next strike low-potential stud C³, so that the coils on switches G² G³ are in multiple and switch G³ will close. The battery is available at any time to complete a circuit through the switch-magnets and close one or more of the switches when the line-current is not available.

In Fig. 2 a somewhat similar system is shown. In fact, the only difference is in the arrangement of the high-potential studs. Here the studs of adjacent pairs or sets overlap, as shown. In this way the high-potential studs may all be arranged in a single row, but greater insulation distance be maintained between the different pairs of studs. The operation of the system will be understood from the previous description of the system of Fig. 1. It differs in no substantial particular.

In Fig. 3 another modified system is shown differing more decidedly from what has been already described. Here the high-potential studs are not all arranged in a single row as in the other figures and as has been customary in the art heretofore, but they are separated in two rows at some distance apart, so that there is a very considerable insulation distance between them. This necessitates a double contact-shoe for the positive studs, (shown at F F²,) which are cross-connected. One set of high-potential studs B B corresponds to switch G and lies in the path of travel of shoe F. The next adjacent set of studs B B' lies on the path of travel of shoe F², and so on. The arrangement of the negative studs and the switch-magnets is not different from that already described, and the mode of operation will be readily understood.

In Fig. 4 one arrangement of contact-studs in the street-surface is shown. Here the high-potential studs B B' B², &c., are arranged in two rows outside of the track-rails, while the low-potential studs are laid in the center of the track. With this arrangement leakage current from the high-potential studs will be short-circuited through the rails and will not pass through the pick-up magnets.

In Fig. 5 the high-potential studs are arranged in two rows between the track-rails and quite close to the rails. The low-potential studs are arranged in the center of the track and as far as possible from the high-potential studs, so that leakage currents will in this case also naturally pass to the rails direct rather than indirectly through the low-potential studs and magnets.

What I claim as new, and desire to secure by Letters Patent of the United States, is—

1. The combination in a surface-contact electric-railway system, of a series of high-potential studs arranged alternately in a number of different parallel rows, switches for connecting said studs with the line-circuit, and electromagnets for closing automatically the switch-contacts, as set forth.

2. The combination in a surface-contact electric-railway system, of a series of high-potential studs arranged alternately in a number of different parallel rows, a series of low-potential studs forming part of the circuit between the negative terminal of the motor and the return-conductor, and a series of switches comprising contacts through which the high-potential studs are connected with the feeder and magnet-coils permanently connected between the low-potential studs and the return-conductor, as set forth.

In witness whereof I have hereunto set my hand this 28th day of December, 1896.

WILLIAM B. POTTER.

Witnesses:
B. B. HULL,
C. L. HAYNES.